US008626111B2

(12) United States Patent
Waddell

(10) Patent No.: US 8,626,111 B2
(45) Date of Patent: Jan. 7, 2014

(54) MOBILE DEVICE SITUATIONAL AWARENESS PROTOCOL

(75) Inventor: Scott Vaughn Waddell, Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 1448 days.

(21) Appl. No.: 12/050,662

(22) Filed: Mar. 18, 2008

(65) Prior Publication Data

US 2009/0239508 A1  Sep. 24, 2009

(51) Int. Cl.
*H04M 9/00* (2006.01)
(52) U.S. Cl.
USPC ....................................... 455/404.1
(58) Field of Classification Search
USPC ........ 455/567, 574, 456.4, 456.1, 414.1, 411, 455/565, 345, 445, 1, 414.3, 566, 456.5, 455/456.2, 556.1, 456.3; 370/338; 379/201.1
See application file for complete search history.

(56) References Cited

U.S. PATENT DOCUMENTS

| 6,631,271 | B1 | 10/2003 | Logan |
| 6,788,766 | B2 | 9/2004 | Logan |
| 6,996,402 | B2 | 2/2006 | Logan et al. |
| 2003/0078080 | A1* | 4/2003 | Miriyala ...................... 455/567 |
| 2007/0037610 | A1* | 2/2007 | Logan .......................... 455/574 |
| 2007/0265019 | A1* | 11/2007 | Rey-Robert ............... 455/456.4 |

FOREIGN PATENT DOCUMENTS

WO  WO 03/007553 A1  1/2003

* cited by examiner

*Primary Examiner* — Kiet Doan
(74) *Attorney, Agent, or Firm* — Tucker Ellis LLP

(57) ABSTRACT

A technique where mobile devices can receive configuration settings tailored to a situation to avoid embarrassing disruptions of meetings and other events through a Mobile Device Situational Awareness Protocol (MDSAP). The MDSAP could also provide location-specific information to the mobile devices that would include presentations and multimedia files or maps and other physical location detail that could be useful in emergencies.

11 Claims, 3 Drawing Sheets

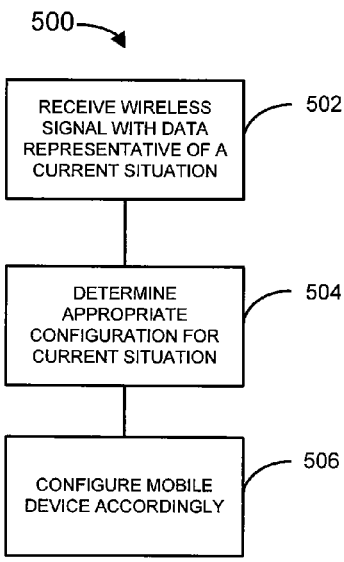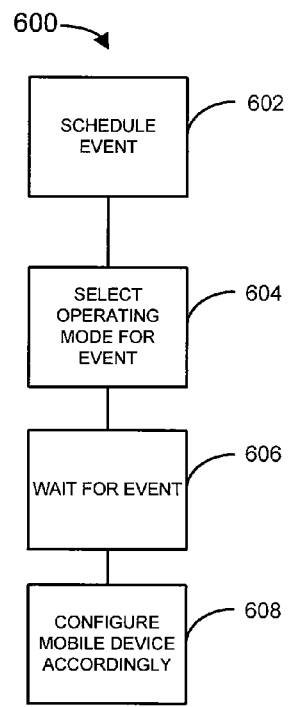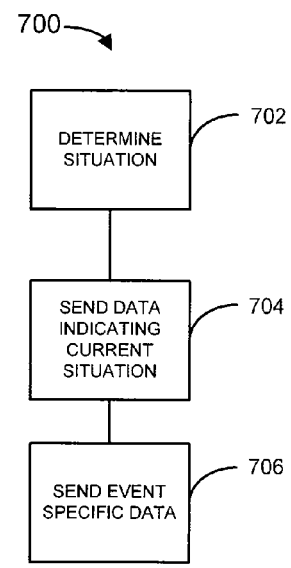
FIG. 5
FIG. 6
FIG. 7
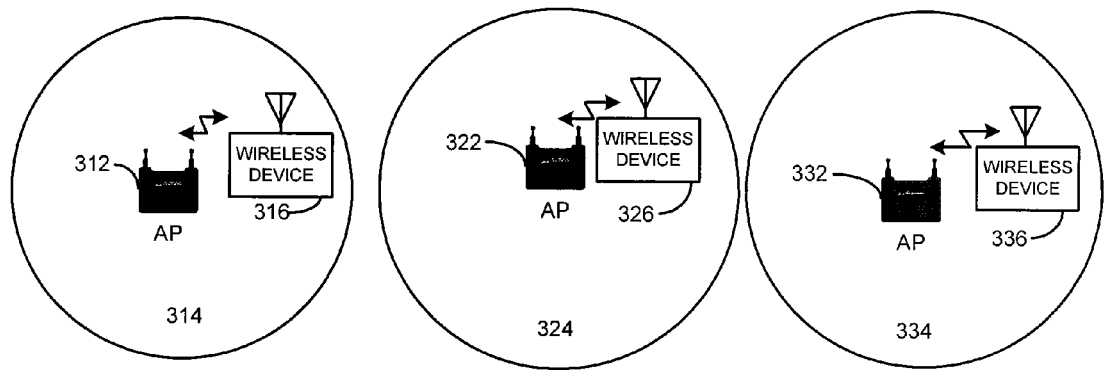
FIG. 3

US 8,626,111 B2

MOBILE DEVICE SITUATIONAL AWARENESS PROTOCOL

TECHNICAL FIELD

The present disclosure relates generally to wireless communications.

BACKGROUND

Mobile devices currently require manual changes to configuration settings so as to fit the user's situation. For example, when entering a meeting or performance hall, a user typically needs to silence their mobile device alerts to avoid interrupting the event. Users frequently forget to do so. This often leads to the disruption and annoyance of other attendees and embarrassment to the user.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a wireless transceiver configured to receive a signal containing data representative of a current situation and control logic in communication with the wireless transceiver. The control logic is configured to change a configurable setting in response to the signal containing data representative of a current situation. As used herein, a configurable setting is a setting that changes the operational mode of the device; for example, mute audio output, turn off transmitter and/or receiver, enable audio output, enable transmitter and/or receiver, receive and display data, etc.

In accordance with an example embodiment, there is disclosed herein a method comprising receiving data indicative of a current situation. An appropriate configuration is determined for the current situation. A configurable setting is changed to match the appropriate configuration for the current situation.

In accordance with an example embodiment, there is disclosed herein an apparatus comprising a wireless transceiver and control logic in communication with the wireless transceiver. The control logic is configured to send data, via the wireless transceiver, indicative of a current situation. In addition, the control logic is configured to send event-specific data via the wireless transceiver associated with the current situation.

In accordance with an example embodiment, there is disclosed herein, a method comprising determining a current situation. Data indicative of the current situation is sent. Furthermore, event-specific data associated with the current situation is also sent.

BRIEF DESCRIPTION OF THE DRAWINGS

The accompanying drawings incorporated herein and forming a part of the specification illustrate the example embodiments.

FIG. 3 illustrates example implementations of example embodiments.

FIG. 5 illustrates an example methodology for configuring a mobile device in response to receiving situational data.

FIG. 6 illustrates an example methodology for configuring a mobile device in response to scheduled events.

FIG. 7 illustrates an example methodology for providing situational data and event-specific data to a mobile device.

DESCRIPTION OF EXAMPLE EMBODIMENTS

Figure 1:
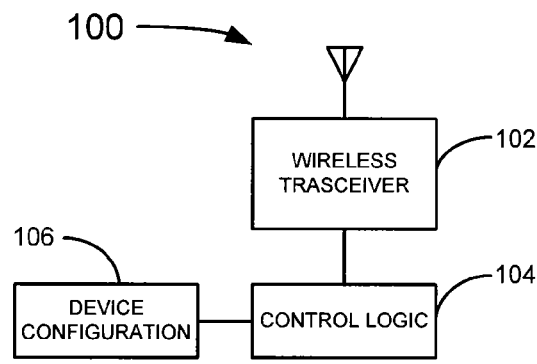
FIG. 1 illustrates an example apparatus configured in accordance with an example embodiment.

This description provides examples not intended to limit the scope of the appended claims. The figures generally indicate the features of the examples, where it is to be understood and appreciated that like reference numerals are used to refer to like elements.

Disclosed herein in an example embodiment is an application layer communications protocol configured to broadcast situational awareness cues to a mobile device (MD). The Mobile Device Situational Awareness Protocol (MDSAP) can operate over any wireless protocol, including existing wireless radio protocols such as Bluetooth™, 802.11 (a, b, g, or n), GSM, TDMA, etc., which are commonly found in consumer mobile devices including mobile phones, personal digital assistants, and laptop computers.

In addition to the MDs themselves, which act as clients in the protocol exchange, one or more Situational Awareness Server Appliances are employed. These may be dedicated infrastructure nodes and/or MDs. For example, in ad hoc wireless networks with no Situational Awareness Server Appliance ("SASA") available at the physical location, one MD may be designated as the SASA.

Upon entering radio communication range with a SASA, an MD would receive configuration settings from the SASA tailored to the situation. For example, an SASA in a conference room would notify MDs in the room to change alerts to the "meeting" or "silent" setting. Likewise, auditoriums or other performance venues may also use an SASA to provide alerts to an MD to use appropriate settings for the environment.

MDSAP-aware software on the MDs would allow users to configure their devices to accept configuration information from SASAs automatically, to accept configuration information after prompting the user, or reject configuration information from SASAs and maintain their current settings. Granular controls can be implemented so that users can define the device behavior profiles for SASA settings like "meeting," "concert," "car," and so on as they see fit. SASA administrators can configure the SASA devices to broadcast the appropriate MD setting information for their venue.

As part of the interaction between mobile device (MD) and situational awareness server appliance (SASA), the MD may notify the SASA as to whether the MD successfully entered the desired operational mode (e.g. changed to "silent" or "no RF transmission" mode). This would enable the SASA to monitor compliance with the MD configuration policies of the venue. For example, in an airplane setting, the SASA could alert the flight crew that some users rejected the configuration change recommended by the SASA when the cabin door was closed, choosing to leave the voice features of their phones enabled. Similarly, a movie theater might have a SASA that asks MDs to disable video recording features and could alert staff if users reject that configuration change.

In addition to MD configuration setting information, the SASA devices could distribute location-specific and event-specific information to MDs. For example, SASAs could provide location-specific information, including maps of the building with the locations of food vendors, restrooms, emergency exits, fire extinguishers, etc. SASAs could also provide event-specific information to MDs, such as copies of presentations, event-specific advertising, or marketing materials, etc. As with the MD configuration settings received from SASA devices, end users could configure their MDs to automatically accept, accept after prompting, or reject SASA location-specific information. The MDSAP can reduce event disruptions without requiring user intervention and/or without requiring forceful techniques, such as radio jamming, that effectively disable a mobile device.

In an example embodiment, a mobile device can be integrated with a calendar. This can enable the mobile device to change modes based on scheduled events such as meetings automatically, even if the mobile device cannot communicate with a SASA. For example, if a meeting was scheduled for 3:00 p.m., a mobile telephone could automatically enter a "meeting" mode at 3:00 p.m., even if no signal was received from a situation awareness server.

A mobile device can be any device that uses wireless communication to communicate with a network such as a laptop computer, personal digital assistant (PDA), and/or mobile telephone.

FIG. 1 illustrates an example apparatus 100 configured in accordance with an example embodiment. Apparatus 100 is suitably adapted for implementing a mobile device that is capable of implementing a mobile device situational protocol, as described herein. Apparatus 100 comprises a wireless transceiver 102, which is configured to receive a wireless signal. Control logic 104 is in communication with wireless transceiver 102. "Logic," as used herein, includes but is not limited to hardware, firmware, software and/or combinations of each used to perform a function(s) or an action(s) and/or to cause a function or action from another component. For example, based on a desired application or need, logic may include a software-controlled microprocessor; discrete logic such as an application specific integrated circuit (ASIC), a programmable/programmed logic device, memory device containing instructions, or the like; or combinational logic embodied in hardware. Logic may also be fully embodied as software.

Device configuration 106 comprises configuration parameters for apparatus 100. Device configuration 106 is in communication with control logic 104.

In an example embodiment, control logic 104 receives situational data via wireless transceiver 102. For example, the situational data may be sent in a unicast, multicast, and/or broadcast message. As another example, situational data may be sent in beacons. Control logic 104 is configured to change a configurable setting in response to the signal containing data representative of a current situation.

Figure 2:
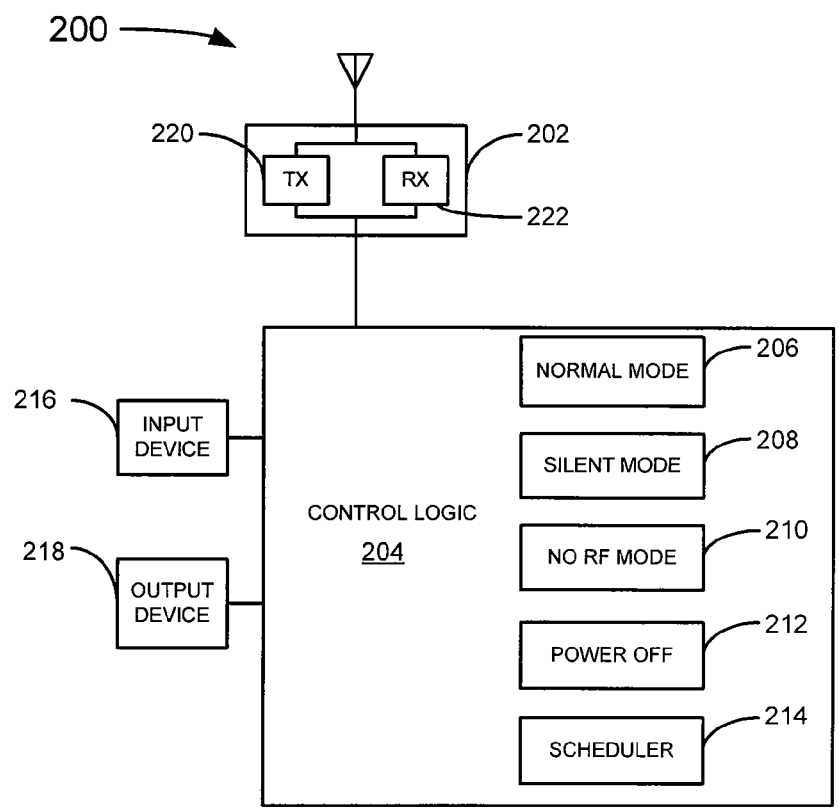
FIG. 2 illustrates a detailed example of a mobile device configured in accordance with an example embodiment.

In an example embodiment, apparatus 100 further comprises an audio output device (not shown, see e.g., FIG. 2). The situational data can contain data indicating that audio output from the device should be muted. For example, this situational data may be sent from a meeting room while a meeting is in progress; a concert hall, theatre, library, or any other type of public performance venue; religious areas; and/or any area where audio output (such as cell phone ringing, pager audio alerts, or computer system boot up signature screens) is not desired. In some embodiments, control logic 104 can switch from an audio output, such as a ringer, to vibrate mode.

In an example embodiment, wireless transceiver 102 comprises a wireless transceiver and a wireless receiver (not shown). Control logic 104 is responsive to switch off the transmitter in response to receiving the data. In particular embodiments, control logic 104 is further configured to switch off the receiver as well. For example, while on an airplane or in a hospital, use of a wireless device such as a laptop computer or PDA may be allowed; however, use of the wireless transceiver may be prohibited. Control logic 104, upon receiving a signal with situational data indicating that use of the wireless receiver and/or transmitter is prohibited, is responsive to turn off the receiver and/or transmitter.

In an example embodiment, control logic 104 may change the operating mode of wireless transceiver 102. For example, situational data may indicate that cellular communications are prohibited but that Bluetooth™ and/or Wifi communications are acceptable. In this example, control logic 104 would configure wireless transceiver 102 to operate either in a Bluetooth™ and/or Wifi compatible mode.

In an example embodiment, control logic 104 automatically changes the configuration setting in response to receiving the situational data. In another example embodiment, apparatus 100 further comprises a user interface (not shown, see e.g. FIG. 2). Control logic 104 is configured to provide an output on the user interface requesting confirmation that the configurable setting should be changed. Control logic 104 is configured to change the configurable setting responsive to receiving data, via the user interface, confirming the change. In an example embodiment, control logic 104 is configured to send data via wireless transceiver 102 indicating whether the configuration setting was changed. This message may be limited to situations where the change in the configurable setting was not accepted or may also include messages to confirm that the change was accepted.

In an example embodiment, control logic 104 receives situational data that is representative of a scheduled event. This data may be stored in a calendar module that is part of control logic 104 or may be received via wireless transceiver 102. For example, upon entering a meeting room, control logic 104 may continue normal operation until wireless transceiver 102 receives situational data indicating the meeting has started.

In an example embodiment, apparatus 100 further comprises an audio output device (not shown, see e.g. FIG. 2) and a video output device (not shown, see e.g. FIG. 2) that are in communication with control logic 104. Control logic 104 can be configured to switch off the audio output device in response to receiving situational data indicating audio output should be muted. Wireless transceiver 102 may further be configured to receive event-specific data that control logic 104 has displayed on the video output device. For example, while a meeting is in progress, the audio output can be muted, while event-specific data such as presentation data, marketing data, advertising data, etc. can be received via wireless interface 102 and displayed on the video output device.

In an example embodiment, wireless transceiver 102 further comprises a transmitter and a receiver. Control logic 104 is configured to enable the transmitter and receiver to operate responsive to receiving the data indicating a location is in a first situation but switches off the transmitter and/or receiver responsive to receiving situational data indicating the first location is in a second situation. For example, when boarding an airplane, cellular telephones are allowed to be used while the cabin door is open. Transceiver 102 can receive data indicating that apparatus 100 is on an airplane, but operations are permitted. When the cabin door is closed, another signal is received comprising data indicating that cellular telephone communications are prohibited. Control logic 104 switches off the transmitter and/or receiver responsive to receiving the data indicating that cellular telephone communications are prohibited. As another example, when arriving in a meeting room, audio signals from computing devices such as cell phones, pagers, PDAs, and/or laptops may be permitted. Once the meeting begins, a signal comprising data indicating that the meeting has begun is received via wireless transceiver 102. Control logic 104 can mute the audio output in response to receiving the signal comprising data indicating that the meeting has begun.

In an example, embodiment, apparatus 100 performs the functionality of a Situational Awareness Server Appliance (SASA) as described herein. In this embodiment, control logic 104 sends situational data via wireless transceiver 102. For example, control logic 104 can send data via wireless transceiver 102 indicating when mobile devices should mute their audio output, turn off receivers and/or transmitters, and/or turn off. In an example embodiment, apparatus 100 is a mobile device, which may receive situational data via wireless transceiver 102 and control logic 104 can then re-transmit the situational data via wireless transceiver 102. In another example embodiment, apparatus 100 can be implemented in an infrastructure node, such as an access point. The situational data may be sent in any type of transmission, including but not limited to probe responses; beacons; and unicast, multicast, and/or broadcast messages.

In an example embodiment, in addition to sending situational data, control logic 104 is configured to send event-specific data via wireless transceiver 102 associated with the current situation. For example, if an emergency condition is encountered, the event-specific data may be map data, data indicating a nearest emergency exit, data indicating a nearest fire extinguisher, and data indicating a nearest location of predetermined equipment (such as a defibrillator, oxygen, etc.). As another example, if the area is a meeting room, the situational data may instruct mobile devices to turn off audio output devices, and the event-specific data can be presentation data, event-specific advertising and/or event-specific marketing materials. For example, while a meeting presenter is speaking, a PowerPoint presentation can be pushed out to the mobile devices.

In an example embodiment, apparatus 100 further comprises an output device (not shown, see e.g., output device 218 in FIG. 2). Wireless transceiver 102 may receive data from a mobile device indicating whether the mobile device performed a configuration change corresponding to the situational data. If a mobile device did not change configuration, data and/or an alarm may be output to indicate the configuration was not changed.

FIG. 2 illustrates a detailed example of a wireless device 200 configured in accordance with an example embodiment. Wireless device 200 comprises a wireless transceiver 202 in communication with control logic 204. Wireless transceiver 202 comprises a transmitter (TX) 220 and a receiver (RX) 222. Control logic 204 comprises configuration data including normal mode (normal operating configuration) 206, silent mode (audio output muted) 208, no RF mode (shut off transmitter 220 and/or receiver 222) 210, power off module 212 (shut device off), and a scheduler module 214. Apparatus 200 further comprises an input device 216 configured to receive user input data. Input device 216 may suitably comprise a keypad, voice activation logic, touch screen, and/or any other suitable means for receiving data from a user. Output device 218 provides output to a user. Output device 218 may suitably comprise an audio output, video output, motional output (e.g. vibration), and/or any other suitable means for providing data to a user. Input device 216 and output device 218 may suitably comprise a user interface.

In an example embodiment, control logic 204 receives situational data via receiver 222 in wireless transceiver 202. For example, the situational data may be sent in a unicast, multicast, and/or broadcast message. As another example, situational data may be sent in beacons. Control logic 204 is configured to change a configurable setting in response to the signal containing data representative of a current situation.

In an example embodiment, situational data is received via receiver 222 and communicated to control logic 204. In addition, or in the alternative, control logic 204 may receive situational data from a calendar module (scheduler) 214. For example, the situational data can contain data indicating that audio output from output device 218 should be muted. This may be received by a wireless signal via receiver 222, or scheduler 214 may communicate to control logic 204 that an event (e.g. a meeting) is scheduled. For example, this may be sent from a meeting room while a meeting is in progress; a concert hall, theatre, or any other type of public performance venue; religious areas; and/or any area where audio output (such as cell phone ringing, pager audio alerts or computer system bootup signature screens) is not desired. In some embodiments, control logic 204 can switch output device 218 from an audio output, such as a ringer, to vibrate mode.

In an example embodiment, control logic 204 is configured to switch off transmitter 220 in response to receiving situational data indicating transmitters should not be used (e.g. No RF mode 210). In particular embodiments, control logic 204 is further configured to switch off the receiver 222 as well. For example, while on an airplane or in a hospital, use of a wireless device such as a laptop computer or PDA may be allowed; however, use of the wireless transceiver 202 may be prohibited. Control logic 204, upon receiving a signal with situational data indicating that use of the wireless receiver 222 and/or transmitter 220 is prohibited, is responsive to turn off the receiver 222 and/or transmitter 220.

In an example embodiment, control logic 204 automatically changes the configuration setting in response to receiving situational data. In another example embodiment, apparatus 200 further provides an output on output device 218 indicating that situation data and requests confirmation that the configurable setting should be changed. Control logic 204 is configured to change the configurable setting responsive to receiving data via input device 216 confirming the change.

In an example embodiment, control logic 204 receives situational data representative of a scheduled event from scheduler 214. In another example embodiment, scheduling data is received via receiver 222. For example, upon entering a meeting room, control logic 104 may continue normal operation until wireless transceiver 102 receives situational data indicating the meeting has started. In an example embodiment, output device 218 comprises an audio output and a video output. Control logic 204 can be configured to switch off the audio output device in response to receiving situational data indicating audio output should be muted. Wireless transceiver 202 may be further configured to receive event-specific data that control logic 204 forwards for display on the video output device. For example, while a meeting is in progress, the audio output can be muted while event-specific data, such as presentation data, marketing data, advertising data, etc., can be received via wireless interface 202 and displayed on the video output device.

In an example embodiment, Control logic 204 is configured to enable the transmitter 220 and receiver 222 to operate responsive the data indicating a location is in a first situation, but switches off transmitter 220 and/or receiver 222 responsive to receiving situational data indicating the first location is in a second situation. For example, when boarding an airplane, cellular telephones are allowed to be used while the cabin door is open. Transceiver 202/receiver 222 can receive data indicating that apparatus 200 is on an airplane but operations are permitted. When the cabin door is closed, another signal is received comprising data indicating that cellular telephone communications are prohibited. Control logic 204 switches the transmitter 220 and/or receiver 222 off responsive to receiving the data indicating that cellular telephone communications are prohibited. As another example, when arriving in a meeting room, audio signals from computing devices such as cell phones, pagers, PDAs, and/or laptops may be permitted. Once the meeting begins, a signal comprising data indicating that the meeting has begun is received via wireless transceiver 202/receiver 222. Control logic 204 can mute the audio output in response to receiving the signal comprising data indicating that the meeting has begun.

In an example embodiment, apparatus 200 performs the functionality of a Situational Awareness Server Appliance (SASA) as described herein. In this embodiment, control logic 204 sends situational data via wireless transceiver 202. For example, control logic 204 can send data via wireless transceiver 202 indicating when mobile devices should mute their audio output, turn off receivers and/or transmitters, and/or turn off. In an example embodiment, apparatus 200 is a mobile device, which may receive situational data via wireless transceiver 202, and control logic 204 can then re-transmit the situational data via wireless transceiver 202. In another example embodiment, apparatus 200 can be implemented in an infrastructure node, such as an access point. The situational data may be sent in any type of transmission, including but not limited to probe responses; beacons; and unicast, multicast, and/or broadcast messages.

In an example embodiment, in addition to sending situational data, control logic 204 is configured to send event-specific data via wireless transceiver 202 associated with the current situation. For example, if an emergency condition is encountered, the event-specific data may be map data, data indicating a nearest emergency exit, data indicating a nearest fire extinguisher, and data indicating a nearest location of predetermined equipment (such as a defibrillator, oxygen, etc.). As another example, if the area is a meeting room, the situational data may instruct mobile devices to turn off audio output devices, and the event-specific data can be presentation data, event-specific advertising, and/or event-specific marketing materials. For example, while a meeting presenter is speaking, a PowerPoint presentation can be pushed out to the mobile devices.

FIG. 3 illustrates example implementations of example embodiments. In the illustrated example, there are three access points (APs) 312, 322, 332 providing service to corresponding areas 314, 324, 334, respectively.

AP 312 is located in a meeting room. AP 312 communicates wirelessly with wireless device 316. AP 312 sends situational data to wireless device 316 indicating that area 314 is a meeting room. Wireless device 316, in response to the situational data, may mute its audio output. AP 312 may also send event-specific data, such as presentation data, which wireless device 316 may display on a video output.

As another example, if wireless device 316 is a cellular telephone, upon receiving situational data from AP 312 wireless device 316 may switch to a 'silent' mode. While in silent mode, if an incoming call is received, the data may be displayed on a video output and/or wireless device 316 may vibrate.

In an example embodiment, AP 322 is in a public performance venue, such as a concert hall. AP 322 sends situational data to wireless device 326, requesting wireless device 326 operate in a quiet mode. Wireless device 326 may automatically switch to a quiet mode or may display a prompt on a user interface asking the user associated with wireless device 326 to confirm the switch into quiet mode. While in quiet mode, audio output may be suppressed, as in meeting mode. In addition, the device may also be inhibited from transmitting. For example, if wireless device 326 is a cell phone, when a call is received by wireless device 326, the call data may be displayed on a visual display, but the phone may be inoperable (for example, the user cannot answer the phone) until the user has moved out of area 324.

As another example, area 334 is a hospital or medical area. When wireless device 336 receives situational data from AP 332 indicating to wireless device 336 that it is in a hospital, wireless device 336 may disable its transmitter and/or receiver. In particular embodiments, wireless device 336 may power itself off responsive to receiving signals from AP 332 and determining it is in area 334.

These are but a few examples of the capabilities of the example embodiments described herein. These examples are by no means exhaustive. Those skilled in the art should readily appreciate that principles of the example embodiments illustrated herein are capable of implementing configuration changes on any type of mobile device where it is desirable to change the configuration in response to a current situation and/or environment.

Figure 4:
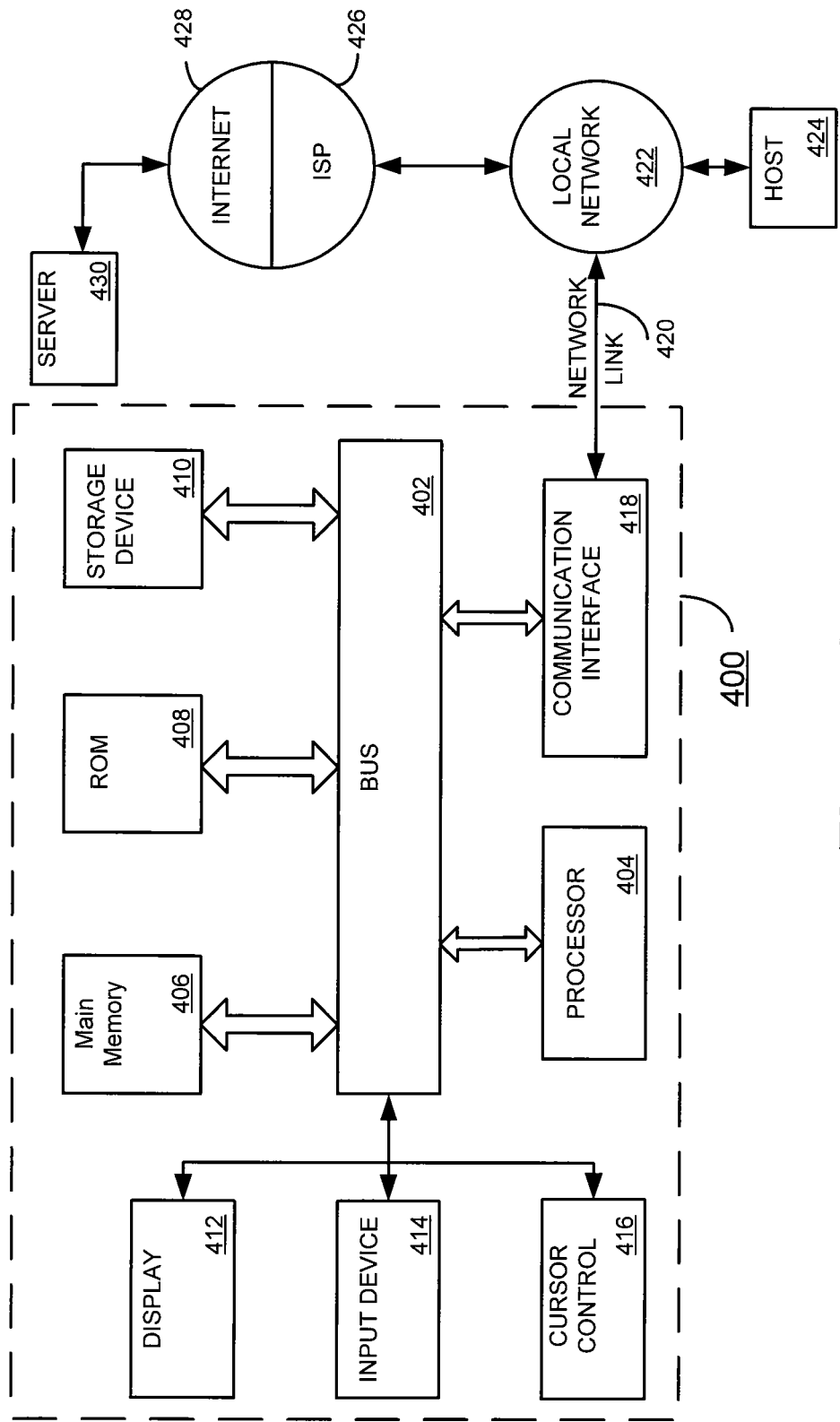
FIG. 4 illustrates a computer system upon which an example embodiment may be implemented.

FIG. 4 is a block diagram that illustrates a computer system 400 upon which an example embodiment may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or liquid crystal display (LCD), for displaying information to a computer user. An input device 414, such as a keyboard including alphanumeric and other keys, is coupled to bus 402 for communicating information and command selections to processor 404. Another type of user input device is cursor control 416, such as a mouse, a trackball, or cursor direction keys, for communicating direction information and command selections to processor 404 and for controlling cursor movement on display 412. This input device typically has two degrees of freedom in two axes, a first axis (e.g. x) and a second axis (e.g. y), that allows the device to specify positions in a plane.

An aspect of the example embodiment is related to the use of computer system 400 for implementing a mobile device situational awareness protocol. According to an example embodiment, the implementation of a mobile device situational awareness protocol is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include, for example, optical or magnetic disks, such as storage device 410. Volatile media include dynamic memory such as main memory 406. Transmission media include coaxial cables, copper wire, and fiber optics, including the wires that comprise bus 402. Transmission media can also take the form of acoustic or light waves such as those generated during radio frequency (RF) and infrared (IR) data communications. Common forms of computer-readable media include, for example, floppy disk, flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 optionally may be stored on storage device 410 either before or after execution by processor 404.

Computer system 400 also includes a communication interface 418 coupled to bus 402. Communication interface 418 provides a two-way data communication coupling computer system 400 to a network link 420 that is connected to a local network 422. In an example embodiment, communication interface 418 is a wireless communication interface and network link 420 is a wireless link.

Network link 420 typically provides data communication through one or more networks to other data devices. For example, network link 420 may provide a connection through local network 422 to a host computer 424 or to data equipment operated by an Internet Service Provider (ISP) 426. ISP 426, in turn, provides data communications through the worldwide packet data communication network, now commonly referred to as the "Internet" 428.

Computer system 400 can send messages and receive data, including program codes, through the network(s), network link 420, and communication interface 418. In the Internet example, a server 430 might transmit a requested code for an application program through Internet 428, ISP 426, local network 422, and communication interface 418. In accordance with an example embodiment, one such downloaded application provides for implementing a mobile device situational awareness protocol as described herein.

In view of the foregoing structural and functional features described above, methodologies in accordance with example embodiments will be better appreciated with reference to FIGS. 5-7. While, for purposes of simplicity of explanation, the methodologies of FIGS. 5-7 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement an example embodiment. The methodologies described herein are suitably adapted to be implemented in hardware, software, or a combination thereof.

FIG. 5 illustrates an example methodology 500 for configuring a mobile device in response to receiving situational data. At 502, a mobile device receives situational data via a wireless transceiver. For example, the situational data may be sent in a unicast, multicast, and/or broadcast message. As another example, situational data may be sent in beacons.

For example, the situational data can contain data indicating that audio output from the device should be muted. As another example, the situational data may indicate that the mobile device is in an area where transmitters and/or receivers should not be operating.

At 504, an appropriate configuration corresponding to the situational data is determined. For example, the situational data may contain configuration data for the situation, and/or the mobile device may have pre-stored configurations. For example, situation data may indicate that the mobile device is in a meeting room; a concert hall, theatre, or any other type of public performance venue; religious areas; and/or any area where audio output (such as cell phone ringing, pager audio alerts, or computer system boot up signature screens) is not desired. For example, the mobile device may determine that it is inside a hospital and transmitters and/or receivers should not be operating.

At 506, the mobile device changes its configuration in accordance with the situational data. For example, audio outputs may be muted, transmitters may be turned off, or other configuration changes appropriate for the current situation may be implemented. As another example, a device, such as apparatus 100 (FIG. 1), can determine the appropriate configuration from stored configurations.

FIG. 6 illustrates an example methodology 600 for configuring a mobile device in response to scheduled events. At 602 an event is scheduled. For example, a user may schedule a meeting for a certain time and place. At 604, an operating mode is selected for the event. For example, for a meeting, audio output may be muted, but vibration and video output may be allowed. At 606, the device waits for the time of the event. At 608, the mobile device is configured accordingly. In an example embodiment, the mobile device may determine it is not at the appropriate location for the event and provide a warning. In an example embodiment, the mobile device does not change configuration until it has determined that it is at the appropriate location for the scheduled event. In yet another example embodiment, the mobile device changes its configuration based on the time of the event and does not not determine whether the mobile device is at the appropriate location. In still another example embodiment, the mobile device presents the user with a display indicating that it is about to change configuration and waits for user input confirming the change before actually changing configuration.

FIG. 7 illustrates an example methodology 700 for providing situational data and event-specific data. Methodology 700 could be implemented by an SASA. At 702, the current situation is determined; for example, if on an airplane, whether the cabin door is opened or closed. The situation may be the current location; for example, when in a certain area a mobile device should change to a pre-defined configuration.

At 704, situational data is sent indicating the current situation. The data may be sent as part of a beacon and/or in unicast, multicast, and/or broadcast messages. The situational data may indicate a desired configuration, such as mute audio outputs, turn off transmitters, etc.

At 706, event-specific data is sent. The event-specific data may be information that is to be displayed to a user of a mobile device, providing additional and/or useful data to the user. For example, the event-specific data may be map data, data indicating a nearest emergency exit, data indicating a nearest fire extinguisher, and data indicating a nearest location of predetermined equipment, etc. responsive to an emergency situation such as a fire. As another example, for a meeting, event-specific data can be presentation data, event-specific advertising, and/or event-specific marketing materials.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. An apparatus, comprising:
a wireless transceiver configured to receive a signal containing mobile device situational awareness data indicating a desired operational mode for the mobile device; and
control logic in communication with the wireless transceiver;
wherein the control logic is operable to maintain data representative of a scheduled event for a predetermined time period;
wherein the control logic is operable to receive data representative of a current location:
wherein the control logic is configured to change a configurable setting to achieve the desired operational mode during the scheduled event in response to determining that the apparatus is at an appropriate location for the scheduled event;
wherein the wireless transceiver comprises a wireless transmitter and a wireless receiver;
wherein the configurable setting contains data indicating the wireless transmitter should be switched off; and
wherein the control logic is configured to switch off the transmitter in response to the change in the configurable setting;
further comprising:
an audio output device in communication with the control logic;
a video output device in communication with the control logic;
wherein the control logic is configured to switch off the audio output device in response to the mobile device situational awareness data; and
wherein the control logic is configured to display event-specific data on the video output device.

2. The apparatus according to claim 1, further comprising:
an audio output;
wherein the mobile device situational awareness data represents a type of location; and
wherein the control logic mutes the audio output in response to receiving the data.

3. The apparatus according to claim 2, wherein the type of location is a meeting room.

4. The apparatus according to claim 2, wherein the type of location is a performance venue.

5. The apparatus according to claim 1, wherein the control logic is further configured to switch off the receiver in response to receiving the mobile device situational awareness data.

6. The apparatus according to claim 1, further comprising a user interface;
wherein the control logic is configured to provide an output on the user interface requesting confirmation that the operational mode should be changed; and
wherein the control logic is configured to change the operational mode responsive to receiving data via the user interface confirming the change.

7. The apparatus according to claim 6, wherein the control logic is configured to transmit data via the wireless interface indicating whether the user has confirmed the change.

8. A method, comprising:
receiving mobile device situational awareness data indicative of a desired mode of operation for a current situation;
determining an appropriate configuration for the current situation; and
changing a configurable setting to match the desired mode of operation for the current situation, wherein the mobile device situational awareness data contains data indicating a video recording should be disabled; and
video recording is disabled in response to receiving the mobile device situational awareness data;
wherein the data indicating a desired mode of operation is a quiet mode of operation; and
wherein the changing of a configurable setting comprises muting audio output and further comprising:
receiving event-specific data associated with the current situation; and displaying the event-specific data associated with the current situation.

9. The method according to claim 8, wherein the data indicates a scheduled event is beginning; and
wherein the changing of a configurable setting comprises muting audio output.

10. An apparatus, comprising:
a wireless transceiver; and
control logic in communication with the wireless transceiver;
wherein the control logic is configured to send mobile device situational awareness data, via the wireless transceiver, indicative of a current situation;
wherein the control logic is configured to send event-specific data for a scheduled event via the wireless transceiver associated with the current situation; and
wherein the event-specific data is selected from a group consisting of presentation data, event-specific advertising, and event-specific marketing materials;
further comprising:
a user interface for providing data to an associated user;
wherein the control logic is configured to receive a message from the wireless transceiver comprising data indicating whether a mobile device changed configuration responsive to the current situation; and wherein the control logic is configured to provide data on the user interface responsive to determining a mobile device did not change configuration responsive to the current situation.

11. The apparatus according to claim 10, wherein the data indicative of a current situation comprises data instructing a recipient to mute audio output.

* * * * *